US009890731B2

(12) United States Patent
Ariie et al.

(10) Patent No.: US 9,890,731 B2
(45) Date of Patent: Feb. 13, 2018

(54) GASEOUS FUEL SUPPLY DEVICE

(71) Applicants: AISAN KOGYO KABUSHIKI KAISHA, Obu-shi, Aichi-ken (JP); TOYOTA JIDOSHA KABUSHIKI KAISHA, Toyota-shi, Aichi-ken (JP)

(72) Inventors: Takahiro Ariie, Nisshin (JP); Akito Onishi, Nagoya (JP)

(73) Assignees: AISAN KOGYO KABUSHIKI KAISHA, Obu-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/033,729

(22) PCT Filed: Nov. 26, 2014

(86) PCT No.: PCT/JP2014/081294
§ 371 (c)(1),
(2) Date: May 2, 2016

(87) PCT Pub. No.: WO2015/080172
PCT Pub. Date: Jun. 4, 2015

(65) Prior Publication Data
US 2016/0273472 A1 Sep. 22, 2016

(30) Foreign Application Priority Data

Nov. 28, 2013 (JP) ................................. 2013-246590

(51) Int. Cl.
*F02D 41/22* (2006.01)
*F02D 19/06* (2006.01)
(Continued)

(52) U.S. Cl.
CPC ......... *F02D 41/22* (2013.01); *F02D 19/0623* (2013.01); *F02D 19/0647* (2013.01);
(Continued)

(58) Field of Classification Search
CPC ...... F02D 41/22; F02D 41/26; F02D 41/3005; F02D 41/0027; F02D 19/0647;
(Continued)

(56) References Cited

U.S. PATENT DOCUMENTS 5,632,250 A  5/1997  Kato et al.
7,383,826 B2 * 6/2008  Kano ..................... F02M 25/08
                                                        123/518
(Continued)

FOREIGN PATENT DOCUMENTS

CN  102695865 A  9/2012
JP  H08-93566 A  4/1996
(Continued)

OTHER PUBLICATIONS

Oct. 11, 2017 Office Action issued in Chinese Patent Application No. 201480064487.8.

*Primary Examiner* — Joseph Dallo
(74) *Attorney, Agent, or Firm* — Oliff PLC

(57) ABSTRACT

To exert combustion control using a CNG injector, a first cutoff valve is opened. On condition that the first cutoff valve is opened, the presence or absence of fuel leakage in a high-pressure side path is determined based on a drop in a detected value of a pressure in the high-pressure side path (high-pressure side detected value PH). Inserting a nozzle for CNG filling into a filling opening causes a phenomenon where the high-pressure side detected value PH rises once and then drops. If the high-pressure side detected value PH rises at a specified rate or more, a CPU stops determination as to the presence or absence of a fuel leakage malfunction for a specified period of time.

7 Claims, 8 Drawing Sheets

(51) Int. Cl.
*F02D 41/00* (2006.01)
*F02D 41/26* (2006.01)
*F02D 41/30* (2006.01)
*F02M 37/00* (2006.01)
*F02M 21/02* (2006.01)

(52) U.S. Cl.
CPC ......... *F02D 41/0027* (2013.01); *F02D 41/26* (2013.01); *F02D 41/3005* (2013.01); *F02M 21/0215* (2013.01); *F02M 21/0278* (2013.01); *F02M 37/0047* (2013.01); *F02D 2041/224* (2013.01); *F02D 2041/225* (2013.01); *F02D 2200/0602* (2013.01); *Y02T 10/32* (2013.01); *Y02T 10/36* (2013.01)

(58) Field of Classification Search
CPC ........... F02D 19/0623; F02D 2041/224; F02D 2200/0602; F02D 2041/225; F02M 21/0278; F02M 21/0215; F02M 37/0047; Y02T 10/36
See application file for complete search history.

(56) References Cited

U.S. PATENT DOCUMENTS

| | | | | |
|---|---|---|---|---|
| 2007/0157908 | A1* | 7/2007 | Kano | F02M 25/08 123/520 |
| 2012/0095669 | A1* | 4/2012 | Katsurahara | F02D 41/221 701/107 |
| 2014/0311460 | A1* | 10/2014 | Tsutsui | F02D 41/0025 123/478 |
| 2014/0338645 | A1* | 11/2014 | Ariie | F02D 19/0613 123/575 |

FOREIGN PATENT DOCUMENTS

| | | |
|---|---|---|
| JP | H09-242614 A | 9/1997 |
| JP | H10-47139 A | 2/1998 |
| JP | 2003-003909 A | 1/2003 |
| JP | 2008-215167 A | 9/2008 |
| JP | 2012-251443 A | 12/2012 |

* cited by examiner

GASEOUS FUEL SUPPLY DEVICE

TECHNICAL FIELD

This invention relates to a gaseous fuel supply device that detects a malfunction based on pressure drop in a fuel supply path between a storage chamber of gaseous fuel and an injector.

BACKGROUND ART

In a gaseous fuel supply device disclosed in patent document 1, a filling route used for filling a fuel tank with gaseous fuel to be stored in the tank communicates with a fuel supply path used for supplying the fuel from the fuel tank to an injector. In this device, a fuel filling opening can communicate with the fuel tank through a solenoid valve and can communicate with the fuel tank through a first check valve. The solenoid valve and the first check valve meet each other in an upstream position near the fuel filling opening. The solenoid valve and the first check valve are connected to the fuel filling opening through a second check valve upstream from the solenoid valve and the first check valve. Patent document 1 recites that the first check valve is set at a valve opening pressure lower than that of the second check valve. The invention of patent document 1 places attention to a point that if the fuel tank is filled with the fuel from the fuel filling opening with the solenoid valve being kept closed while the respective valve opening pressures of the first and second check valves are in an inverse relationship, a fuel pressure in the fuel supply path rises and then drops and this pressure drop is sensed. Specifically, if the fuel pressure in the fuel supply path becomes the valve opening pressure of the first check valve or more during filling with the fuel, the first check valve is opened to drop the pressure in the fuel supply path once. Patent document 1 recites in paragraphs "0031" to "0034" that setting the first check valve at a valve opening pressure lower than that of the second check valve can prevent an announcement of a pressure drop in the fuel supply path from being issued during filling with the fuel.

Patent document 1 further recites in paragraph "0046" that a fuel-filled state is determined based on excess of a pressure in the fuel supply path over a predetermined value instead of setting a valve opening pressure, and then the actuation of a pressure sensor is stopped or an announcement is stopped.

The aforementioned phenomenon is not the only situation where an announcement is issued erroneously as a result of temporal drop in a fuel pressure during filling with the fuel. Even if the solenoid valve is kept opened during filling with the fuel, a pressure in the fuel supply path may still drop to the aforementioned level, while not dropping to a level targeted for an announcement. If the fuel-filled state is determined based on excess of a pressure in the fuel supply path over the predetermined value, an announcement may be issued erroneously or a period when an announcement stops may be extended more than necessary in a manner that depends on a way of setting a valve opening pressure.

PRIOR ART DOCUMENT

Patent Document

Patent document 1: Japanese Laid-Open Patent Publication No. 2008-215167

SUMMARY OF THE INVENTION

Problems that the Invention is to Solve

It is an object of this invention to provide a gaseous fuel supply device capable of reducing the probability of a fail-safe process being implemented erroneously if a malfunction is detected based on pressure drop in a fuel supply path between a storage chamber of gaseous fuel and an injector.

Means for Solving the Problems

To solve the aforementioned problem, according to a first aspect of this invention, a gaseous fuel supply device includes: a storage chamber of gaseous fuel; an injector used for supplying the gaseous fuel to a combustion chamber of an internal combustion engine; a pressure detector that detects a pressure in a fuel supply path between the storage chamber and the injector; a malfunction detector that detects a malfunction based on a drop in the pressure detected by the pressure detector; a fail-safe implementing part that implements a fail-safe process if the malfunction detector detects a malfunction; and a stop processor that stops malfunction detection for implementing the fail-safe process for a specified period of time if the pressure is determined to rise at a specified rate or more.

The pressure of gas remaining in a nozzle for gaseous fuel filling is higher than a pressure in the fuel supply path. Thus, inserting this nozzle into a filling opening causes a phenomenon where the pressure in the fuel supply path rises once and then drops. This pressure drop following the pressure rise becomes a cause for detection of a malfunction to make the fail-safe implementing part implement the fail-safe process erroneously. In this case, the pressure rises once and drops immediately thereafter for the following reason. Before the process of filling with the gaseous fuel is started, the gaseous fuel does not remain in large amount in the nozzle. Thus, a pressure in the nozzle, a pressure in the fuel supply path, and a pressure in the storage chamber become equal to each other at a level lower than that of a pressure at a time immediately after insertion of the nozzle. In this regard, the stop processor can make it unlikely that the fail-safe process will be implemented erroneously. In particular, by using the rise rate of the pressure, pressure rise resulting from insertion of the nozzle into the filling opening can be captured correctly.

In the aforementioned gaseous fuel supply device, the stop processor is preferably a first stop processor. The gaseous fuel supply device preferably includes a second stop processor that stops the malfunction detection for implementing the fail-safe process for a predetermined period if it is determined that the pressure has increased by an amount the same as a predetermined value or more.

If the filling is started after the nozzle for gaseous fuel filling is inserted into the filling opening, a pressure in the fuel supply path rises. Meanwhile, in a period of the filling, a phenomenon occurs where the pressure stops rising once and then rises again. As a result of this phenomenon, the fail-safe process is implemented erroneously if a malfunction is detected based on a pressure drop. This phenomenon is caused for the reason that the pressure of the gaseous fuel supplied from the nozzle is raised in stages by a compressor. Specifically, to raise the pressure of the gaseous fuel for filling, supply of the gaseous fuel is stopped once. Before supply of the gaseous fuel is stopped once, the pressure of the gaseous fuel supplied from the nozzle makes a pressure in the fuel supply path higher than a pressure that achieves a state of equilibrium between a pressure in the fuel supply path and a pressure in the storage chamber. By contrast, if supply of the gaseous fuel is stopped temporarily, the pressure in the fuel supply path rapidly drops to the pressure that achieves a state of equilibrium between the pressure in the fuel supply path and the pressure in the storage chamber. In this regard, the second stop processor can make it unlikely that the fail-safe process will be implemented erroneously as a result of the aforementioned phenomenon.

In the aforementioned gaseous fuel supply device, the predetermined period is preferably longer than the specified period of time.

A period when a pressure drops once during implementation of a filling process is longer than a period when the pressure rises and drops as a result of insertion of the nozzle for gaseous fuel filling into the filling opening. This is for the reason that during implementation of the filling process, timing of raising the pressure of the gaseous fuel supplied from the nozzle in stages is changed in various ways and the number of times the pressure rises is also changed in various ways. In this regard, setting the predetermined period to be longer than the specified period of time can make it unlikely that a period when the malfunction detection to be implemented for the fail-safe process as a result of insertion of the nozzle into the filling opening will be extended excessively.

The aforementioned gaseous fuel supply device includes: an injector used for supplying gaseous fuel to a combustion chamber of an internal combustion engine; a pressure detector that detects a pressure in a fuel supply path between a storage chamber and the injector; a malfunction detector that detects a malfunction based on a drop in the pressure detected by the pressure detector; a fail-safe implementing part that implements a fail-safe process if the malfunction detector detects a malfunction; a first stop processor that stops malfunction detection for implementing the fail-safe process for a specified period of time if the pressure is determined to rise by an amount the same as a threshold or more; and a second stop processor that stops the malfunction detection for implementing the fail-safe process for a predetermined period if the pressure is determined to rise by an amount the same as a predetermined value or more. The predetermined value is higher than the threshold. The predetermined period is preferably longer than the specified period of time.

The pressure of gas remaining in a nozzle for gaseous fuel filling is higher than a pressure in the fuel supply path. Thus, inserting this nozzle into the filling opening causes a phenomenon where the pressure in the fuel supply path rises once and then drops. This pressure drop following the pressure rise becomes a cause for detection of a malfunction to make the fail-safe implementing part implement the fail-safe process erroneously. In this case, the pressure rises once and drops immediately thereafter for the following reason. Before the process of filling with the gaseous fuel is started, the gaseous fuel does not remain in large amount in the nozzle. Thus, a pressure in the nozzle, a pressure in the fuel supply path, and a pressure in the storage chamber become equal to each other at a level lower than that of a pressure at a time immediately after insertion of the nozzle.

If the filling is started after the nozzle for gaseous fuel filling is inserted into the filling opening, a pressure in the fuel supply path rises. Meanwhile, in a period of the filling, a phenomenon occurs where the pressure stops rising once and then rises again. As a result of this phenomenon, the fail-safe process is implemented erroneously if a malfunction is detected based on pressure drop. This phenomenon is caused for the reason that the pressure of the gaseous fuel supplied from the nozzle is raised in stages by a compressor. Specifically, to raise the pressure of the gaseous fuel for filling, supply of the gaseous fuel is stopped once. Before supply of the gaseous fuel is stopped once, the pressure of the gaseous fuel supplied from the nozzle makes a pressure in the fuel supply path higher than a pressure that achieves a state of equilibrium between a pressure in the fuel supply path and a pressure in the storage chamber. By contrast, if supply of the gaseous fuel is stopped temporarily, the pressure in the fuel supply path rapidly drops to the pressure that achieves a state of equilibrium between the pressure in the fuel supply path and the pressure in the storage chamber. In this regard, the provision of the first and the second stop processors can make it unlikely that the fail-safe process will be implemented erroneously as a result of the aforementioned phenomenon.

A period when a pressure drops once during implementation of a filling process is longer than a period when the pressure rises and drops as a result of insertion of the nozzle for gaseous fuel filling into the filling opening. This is for the reason that during implementation of the filling process, timing of raising the pressure of the gaseous fuel supplied from the nozzle in stages is changed in various ways and the number of times the pressure rises is also changed in various ways. In this regard, setting the predetermined period to be longer than the specified period of time can make it unlikely that a period when the malfunction detection to be implemented for the fail-safe process as a result of insertion of the nozzle into the filling opening will be extended excessively.

In the aforementioned gaseous fuel supply device, the internal combustion engine is preferably a vehicle-installed internal combustion engine and the end of the predetermined period is preferably set based on timing of detecting start of travel of a vehicle.

The filling process is completed at the start of travel of the vehicle. By defining the end of the predetermined period while placing attention on this point, the probability of the predetermined period being extended excessively can be reduced.

In the aforementioned gaseous fuel supply device, the rise amount of the pressure is preferably sensed as the amount of rise from a value of the pressure before the pressure rises and the second stop processor preferably sets the predetermined value at a higher value as the pressure to be detected takes a higher value before the pressure rises.

The predetermined value used for defining a condition for stopping the malfunction detection is set at a higher value as the pressure to be detected takes a higher value before the pressure rises. As a result, a filling period where the malfunction detection is to be stopped can be specified with a high degree of accuracy. Specifically, the pressure of the gaseous fuel rises with temperature rise. Thus, pressure rise resulting from temperature rise and pressure rise resulting from the filling process with fuel are desirably distinguished from one another. In this case, if a pressure in the fuel supply path is high, the rise amount of the pressure resulting from temperature rise is larger than a rise amount if the pressure in the fuel supply path is low. This causes a risk in that, if the predetermined value is fixed, the malfunction detection cannot be stopped while the filling process is being implemented. While attention is placed on this point, the predetermined value is set in response to a value of the pressure to be detected before the pressure rises.

The aforementioned gaseous fuel supply device preferably includes a solenoid valve that is opened and closed for communication between the fuel supply path and the storage chamber. Preferably, if the solenoid valve is opened, the malfunction detector implements the malfunction detection.

The malfunction detector detects a malfunction while the solenoid valve is opened. Even in this case, a pressure in the fuel supply path still drops if the nozzle for gaseous fuel filling is inserted into the filling opening or the pressure of the gaseous fuel supplied during the filling process is changed in stages, causing a risk in that the fail-safe process is implemented erroneously. Such a situation cannot be avoided by means intended to prevent a malfunction from being detected erroneously as a result of the filling process implemented when the solenoid valve is opened. This places a high value particularly on the use of the stop processor.

MODE FOR CARRYING OUT THE INVENTION

First Embodiment

Figure 1:
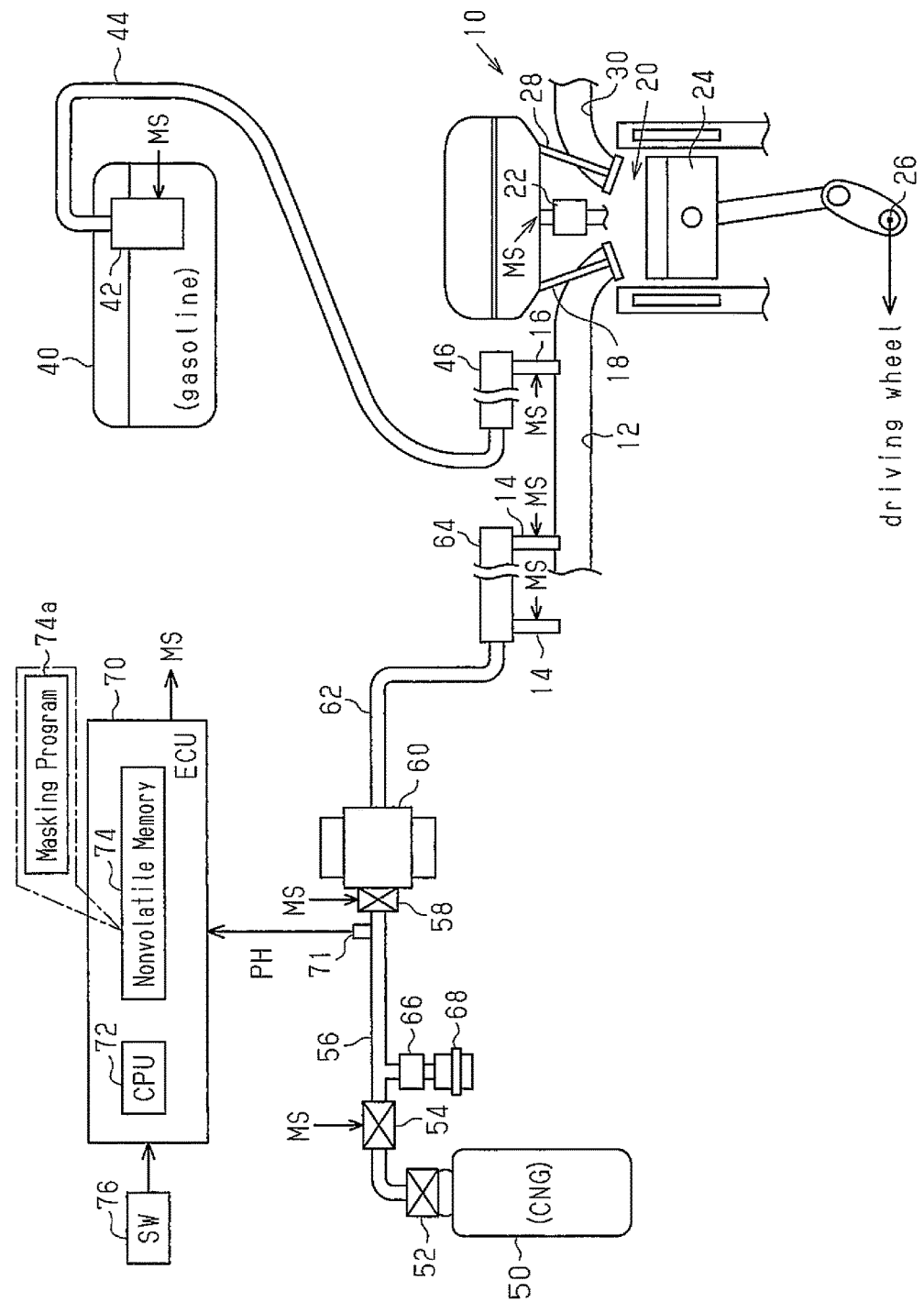
FIG. 1 is a schematic view showing an overall structure of a system to which a gaseous fuel supply device according to a first embodiment of this invention is applied.

A first embodiment that embodies a gaseous fuel supply device of this invention is described below by referring to FIGS. 1 to 9(e). An internal combustion engine 10 shown in FIG. 1 is a bi-fuel internal combustion engine and uses CNG (compressed natural gas) as gaseous fuel and gasoline as liquid fuel to take the place of the CNG. In the first embodiment, the internal combustion engine 10 is a multi-cylinder internal combustion engine. However, only one cylinder is shown in FIG. 1.

As shown in FIG. 1, the internal combustion engine 10 includes an intake path 12 to which a CNG injector 14 and a gasoline injector 16 are attached. Fuel is injected into the intake path 12 from the CNG injector 14 or the gasoline injector 16. The injected fuel is mixed with intake air to generate an air-fuel mixture. The air-fuel mixture is drawn into a combustion chamber 20 in response to opening of an intake valve 18. In the combustion chamber 20, a spark plug 22 ignites to cause combustion of the air-fuel mixture. Energy resulting from the combustion is converted to the rotation energy of a crankshaft 26 through a piston 24 and transmitted to a driving wheel (not shown in the drawings) of a vehicle. After the combustion, the air-fuel mixture becomes an exhaust and is emitted from an exhaust path 30 in response to opening of an exhaust valve 28.

The CNG supplied to the CNG injector 14 is stored in a CNG container 50. The CNG in the CNG container 50 is supplied to a CNG delivery pipe 64 through a high-pressure side path 56 and a low-pressure side path 62 each functioning as a fuel supply path. The CNG in the CNG delivery pipe 64 is injected into the intake path 12 from the CNG injector 14 assigned to each of a plurality of cylinders. A manual on-off valve 52 as a hand-operated on-off valve and an electromagnetically-driven first cutoff valve 54 are provided between the CNG container 50 and the high-pressure side path 56.

A regulator 60 is provided in a position downstream from the high-pressure side path 56. The regulator 60 reduces the pressure of the CNG supplied from the CNG container 50 through an electromagnetically-driven second cutoff valve 58 to a predetermined pressure. The CNG reduced in pressure is supplied to the CNG delivery pipe 64 through the low-pressure side path 62.

A high-pressure side pressure sensor 71 as a pressure detector is provided to a position upstream from the regulator 60. The high-pressure side pressure sensor 71 detects a pressure in the high-pressure side path 56 in a place upstream from the second cutoff valve 58 as a high-pressure side detected value PH. A filling opening 68 is connected to the high-pressure side path 56 through a check valve 66. A nozzle of a CNG station used for CNG filling is inserted into the filling opening 68. The check valve 66 is opened if a pressure in the filling opening 68 is higher than a pressure in the high-pressure side path 56 by a predetermined value or more.

Gasoline to be supplied to the gasoline injector 16 is stored in a gasoline tank 40, or a storage chamber. The gasoline in the gasoline tank 40 is drawn through a fuel pump 42 and supplied to a gasoline delivery pipe 46 through a gasoline supply path 44. The gasoline in the gasoline delivery pipe 46 is injected into the intake path 12 from the gasoline injector 16 assigned to each cylinder.

An ECU 70 is an electronic control unit including a CPU 72 and a nonvolatile memory 74. The CPU 72 is a central processing unit that executes various programs stored in the nonvolatile memory 74. The nonvolatile memory 74 is a storage device that stores and retains data both in the presence and absence of power feeding.

The ECU 70 outputs a manipulated signal MS to each of various actuators such as the first and second cutoff valves 54 and 58, the CNG injector 14, the gasoline injector 16, the spark plug 22, and the fuel pump 42 to exert control over combustion of the air-fuel mixture in the combustion chamber 20, specifically, to exert combustion control in the internal combustion engine 10. The ECU 70 is connected to a selection switch 76 for letting a user select either of the following two modes: a mode where the combustion control in the internal combustion engine 10 is exerted based on fuel injection control using the CNG injector 14; and a mode where the combustion control in the internal combustion engine 10 is exerted based on fuel injection control using the gasoline injector 16. Based on operation on the selection switch 76, the ECU 70 determines which of the mode of exerting the combustion control using the CNG and the mode of exerting the combustion control using the gasoline is to be adopted.

If the mode of exerting the combustion control using the CNG injector 14 is adopted, the ECU 70 opens the first and second cutoff valves 54 and 58 to establish communication between the CNG injector 14 and the CNG container 50. Further, the ECU 70 opens and closes the CNG injector 14 to inject the CNG from the CNG injector 14 into the intake path 12. If the mode of exerting the combustion control using the gasoline injector 16 is adopted, the ECU 70 drives the fuel pump 42 to supply the gasoline in the gasoline tank 40 to the gasoline injector 16. Further, the ECU 70 opens and closes the gasoline injector 16 to inject the gasoline from the gasoline injector 16 into the intake path 12. If the combustion control using the CNG injector 14 is not to be exerted, the ECU 70 closes the first and second cutoff valves 54 and 58 to interrupt the communication between the CNG injector 14 and the CNG container 50. The first and second cutoff valves 54 and 58 are desirably normally closed valves.

A procedure of a process of the combustion control using the CNG injector 14 is described next by referring to the flow chart of FIG. 2. This process is repeated at a predetermined frequency by the ECU 70.

Figure 2:
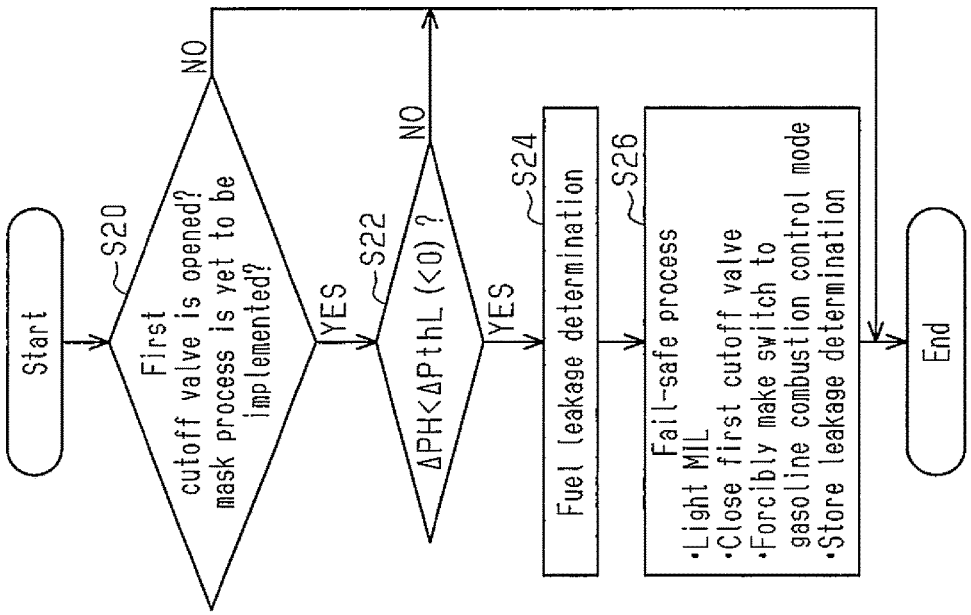
FIG. 2 is a flowchart showing a procedure of a process of CNG combustion control.

As shown in FIG. 2, the ECU 70 first determines whether or not a switch instructing start of the internal combustion engine 10 (ignition switch) is ON (S10). If it is determined that the switch is ON (S10: YES), the ECU 70 determines whether or not the following logical conjunction is satisfied (true) (S12). This logical conjunction includes a condition that the mode where the combustion control using the CNG injector 14 is selected, a condition that the presence of a leakage malfunction in the high-pressure side path 56 is not determined, and a condition that the internal combustion engine 10 has been started and the combustion control using the gasoline injector 16 is being exerted. In the first embodiment, the last condition is provided on the assumption that a process of starting the internal combustion engine 10 is implemented using the gasoline injector 16. If it is determined that the logical conjunction is true (S12: YES), the ECU 70 opens the first cutoff valve 54 (S14), opens the second cutoff valve 58 (S16), and exerts the combustion control using the CNG injector 14 (S18). If the process in step S18 is completed or a negative determination is made in step S10 or S12, the ECU 70 finishes a series of the aforementioned processes once.

A procedure of a process of determining a leakage malfunction is described next by referring to the flow chart of FIG. 3. This process is repeated at a predetermined frequency by the ECU 70.

Figure 3:
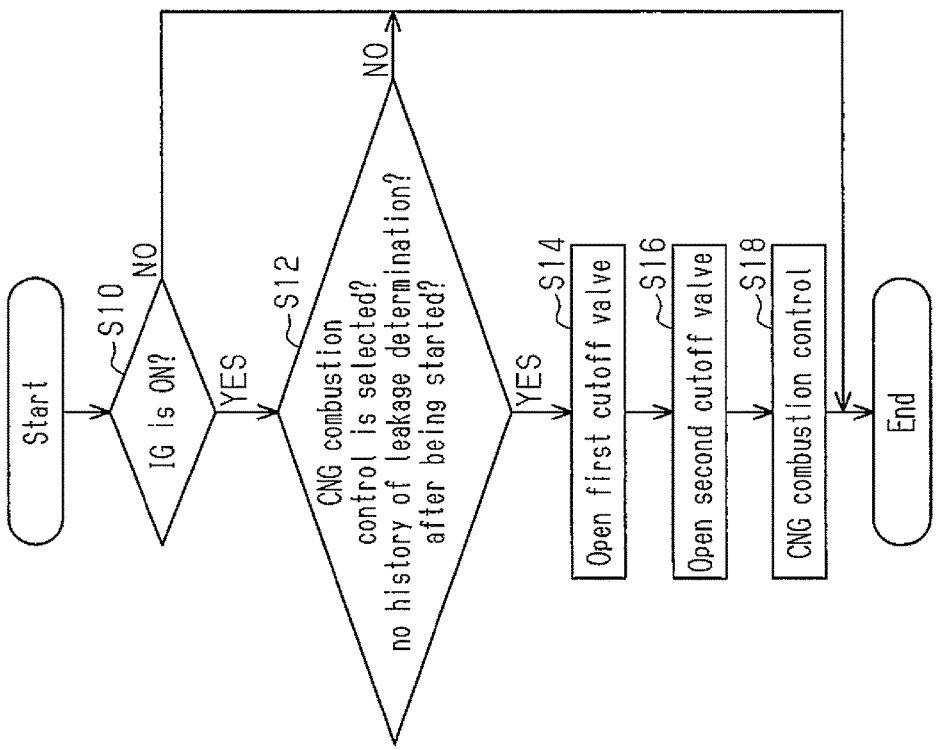
FIG. 3 is a flowchart showing a procedure of a fuel leakage determining process.

As shown in FIG. 3, the ECU 70 first determines whether or not the first cutoff valve 54 is opened and whether or not a mask process described later is yet to be implemented (S20). In this process, the ECU 70 determines whether or not a condition for implementing the process of determining the presence or absence of a leakage malfunction is satisfied. If a positive determination is made in step S20, the ECU 70 determines that the condition for implementing the process of determining the presence or absence of a leakage malfunction is satisfied. Then, the ECU 70 as a malfunction detector determines whether or not a variation ΔPH of the high-pressure side detected value PH is smaller than a negative threshold ΔPthL (S22). The threshold ΔPthL is set at a rate of drop in a fuel pressure to an extent that is not reached by the fuel injection control using the CNG injector 14 in the absence of a malfunction in the high-pressure side path 56. The threshold ΔPthL is calculated by subtracting a last value of the sum of a predetermined number of sampled values of the high-pressure side detected value PH from a current value of this sum. A predetermined number is determined to be two or more with the intention of increasing resistance of this process to noise.

If it is determined that the variation ΔPH is smaller than the threshold ΔPthL (S22: YES), the ECU 70 determines that fuel in the high-pressure side path 56 is lost at an abnormally high rate and determines the presence of a fuel leakage malfunction (S24). Then, the ECU 70 as a fail-safe processor implements a fail-safe process to handle the fuel leakage malfunction in the high-pressure side path 56 (S26). More specifically, the ECU 70 implements the following processes as the fail-safe process. The ECU 70 lights a lamp (MIL) to notify a user of the fuel leakage malfunction. Further, the ECU 70 closes the first cutoff valve 54 to forcibly make a switch to the combustion control mode using the gasoline injector 16. Further, the ECU 70 stores the determination as to the presence of the fuel leakage malfunction into the nonvolatile memory 74 shown in FIG. 1. If the process in step S26 is completed or a negative determination is made in step S20 or S22, the ECU 70 finishes a series of the aforementioned processes once.

As a result of the series of the aforementioned processes, on the occurrence of a leakage malfunction in the high-pressure side path 56, the first cutoff valve 54 is closed and the combustion control is forcibly changed to the control using the gasoline injector 16 regardless of an operation on the selection switch 76. This resolves leakage of the CNG to the outside at an early stage and reduces the probability of shortage of power to be supplied to the driving wheel.

While the CNG container 50 is filled with the CNG at the CNG station for the shortage of the CNG in the CNG container 50, the first cutoff valve 54 is opened if the combustion control using the CNG injector 14 is being exerted. In this case, the process of determining a leakage malfunction shown in FIG. 3 is implemented. This causes a risk in that a fuel leakage malfunction is erroneously determined to be present in the high-pressure side path 56.

Figure 4:
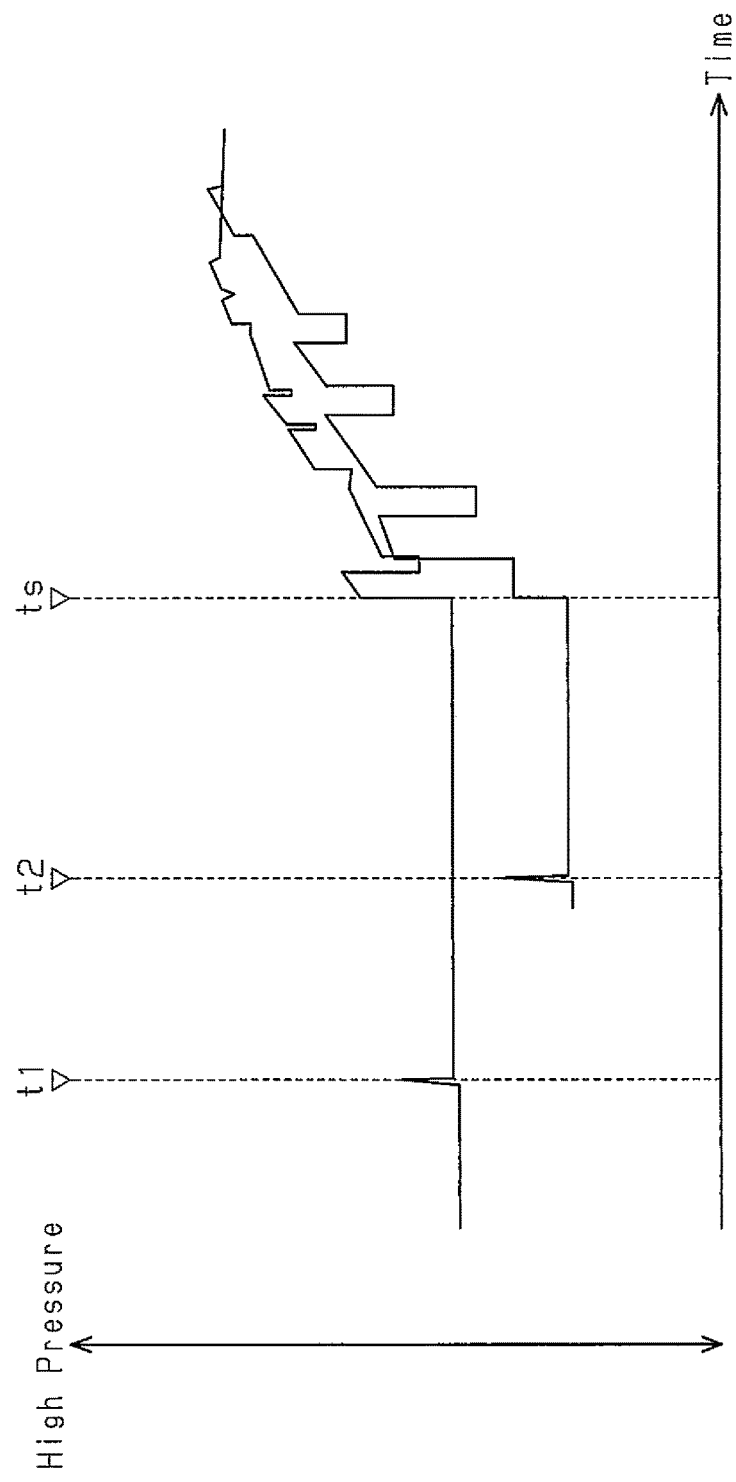
FIG. 4 is a timing diagram showing a phenomenon occurring during fuel filling.

FIG. 4 shows two examples of the behavior of the high-pressure side detected value PH responsive to a filling process. The high-pressure side detected value PH is sampled at different times between the examples. However, for the sake of convenience, the high-pressure side detected value PH is shown to be sampled at the same time using different nozzles for CNG filling in FIG. 4. Regarding timing of inserting the nozzle for CNG filling into the filling opening 68, the two examples shown in FIG. 4 include an example where the nozzle is inserted at a time t1 and an example where the nozzle is inserted at a time t2. Meanwhile, a time when CNG filling from the nozzle for CNG filling is started is ts in each of the examples.

As shown in FIG. 4, at each of the times t1 and t2 when the nozzle for CNG filling is inserted, a phenomenon was observed where the high-pressure side detected value PH rises rapidly once and then drops to a value substantially the same as its previous value. This phenomenon is caused for the reason that a pressure in the nozzle and a tube for CNG filling is higher than a pressure in the high-pressure side path 56. In this case, inserting the nozzle for CNG filling into the filling opening 68 makes the CNG flow from the nozzle for CNG filling into the high-pressure side path 56, thereby raising a pressure in the high-pressure side path 56 once. However, in a period when the filling process with the CNG is not started at the CNG station, a pressure in the nozzle and a pressure in the tube for CNG filling being equal to a pressure in the high-pressure side path 56 and a pressure in the CNG container 50 to achieve a state of equilibrium are substantially the same as a pressure at a time before the nozzle is inserted into the filling opening 68. Thus, the pressure having risen rapidly at the time t1 or t2 drops immediately thereafter.

In a period after the time ts when the filling process is started, the pressure of the CNG to blow out from the nozzle for CNG filling is set at a pressure higher than a pressure in the CNG container 50 at the CNG station. In this period, a pressure in the high-pressure side path 56 and a pressure in the CNG container 50 tend not to be equal to each other. More specifically, a pressure in the high-pressure side path 56 approaches the pressure of the CNG blowing out from the nozzle more easily. Thus, this pressure in the high-pressure side path 56 tends to be higher than a pressure in the CNG container 50. Thus, in some cases, the CNG station raises the pressure of the CNG in stages to blow out from the nozzle as a pressure in the high-pressure side path 56 or the CNG container 50 rises in response to supply of the CNG. To raise the pressure of the CNG, a period of temporally stopping CNG filling from the nozzle is given. In this period, a pressure in the nozzle and a pressure in the tube become equal to a pressure in the high-pressure side path 56 and a pressure in the CNG container 50 to achieve a state of equilibrium. A pressure in the state of equilibrium is lower than the pressure of the CNG blowing out from the nozzle before the filling is stopped. This causes a phenomenon where the high-pressure side detected value PH drops once. As described above, implementing the process of determining a leakage malfunction shown in FIG. 3 immediately after the nozzle for CNG filling is inserted into the filling opening 68 or during CNG filling causes a risk in that "the presence of a fuel leakage malfunction" is erroneously determined.

In the first embodiment, the following two measures are taken against the aforementioned problem.

"Measure to be Taken During Period of CNG Filling"

During a period of CNG filling, a mask process of stopping the leakage malfunction determination is implemented. Specifically, by implementing the mask process while the filling process is determined to be implemented, a negative determination is made as a result of the process in step S20 of FIG. 3.

Figure 5:
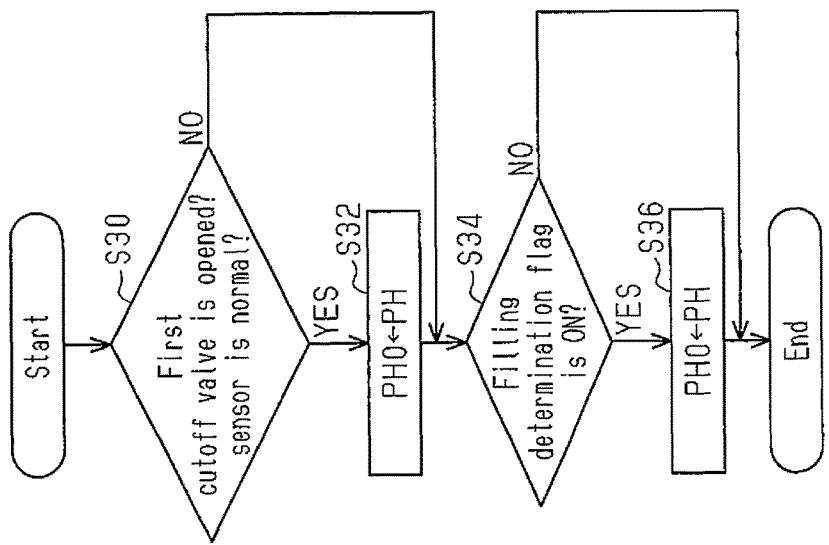
FIG. 5 is a flowchart showing a procedure of a process of setting a reference value.

FIG. 5 shows a procedure of a process of setting a reference value PH0 of the high-pressure side detected value PH. The reference value PH0 is used in a process of determining whether or not a process of CNG filling is being implemented. Specifically, the CNG remaining in the CNG container 50 takes various values before the process of CNG filling is started. The high-pressure side detected value PH can also take various values before the process of CNG filling is started accordingly. Thus, to detect rise in the high-pressure side detected value PH resulting from the process of CNG filling, the reference value PH0 is calculated before each rise in the high-pressure side detected value PH. This process is repeated at a predetermined frequency by the CPU 72 based on a masking program 74a in the nonvolatile memory 74 shown in FIG. 1.

In this process, the CPU 72 first determines whether or not the first cutoff valve 54 is opened, whether or not the high-pressure side detected value PH as a latest sampled value is lower than the reference value PH0, and whether or not the high-pressure side pressure sensor 71 is normal (S30). This process is implemented in order to determine whether or not the reference value PH0 is to be updated. If a positive determination is made in step S30, the CPU 72 adopts the high-pressure side detected value PH as the reference value PH0 (S32).

If the process in step S32 is implemented or if a negative determination is made in step S30, the CPU 72 determines whether or not a filling determination flag indicating that the filling process is being implemented is ON (S34). This process is implemented in order to determine whether or not the reference value PH0 is to be updated to the high-pressure side detected value PH even if the high-pressure side detected value PH as a latest sampled value is the same as the reference value PH0 or more. Specifically, while the filling process is being implemented, the amount of the CNG in the CNG container 50 is increased to raise the high-pressure side detected value PH. After the filling process is completed, the high-pressure side detected value PH becomes higher than a value at a time before the filling process is implemented. In this case, the reference value PH0 is updated. Specifically, if it is determined that the filling determination flag is ON (S34: YES), the CPU 72 updates the high-pressure side detected value PH with the reference value PH0 (S36). If the process in step S36 is completed or a negative determination is made in step S34, the CPU 72 finishes a series of the aforementioned processes once.

Figure 6:
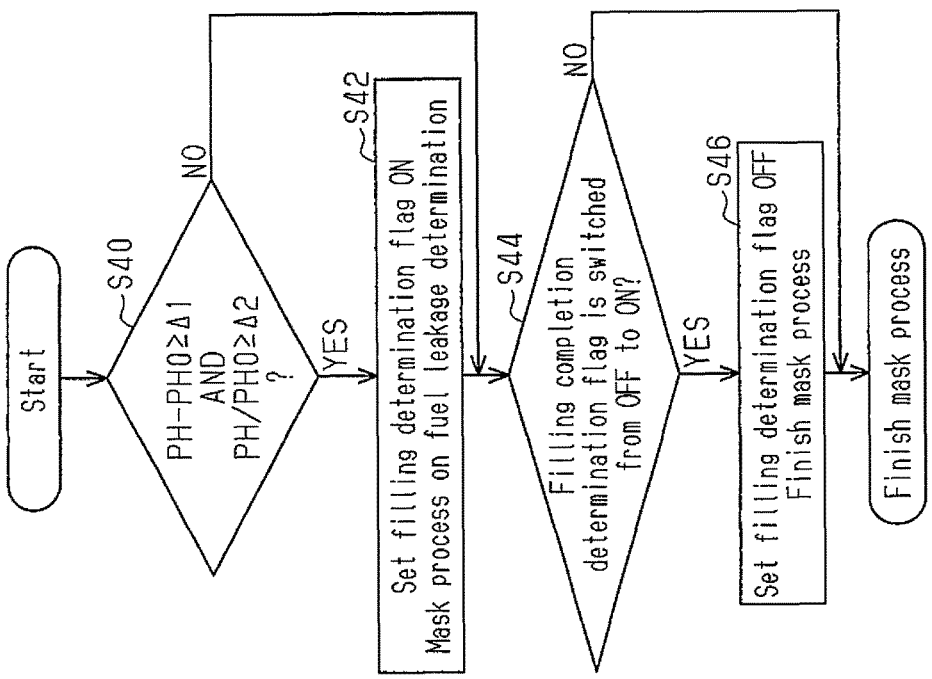
FIG. 6 is a flowchart showing a procedure of a filling determining process.

FIG. 6 shows a procedure of a process of determining whether or not the filling process is being implemented. This process is repeated at a predetermined frequency by the CPU 72 based on the masking program 74a in the nonvolatile memory 74 shown in FIG. 1.

In this process, the CPU 72 first determines whether or not a value obtained by subtracting the reference value PH0 from the high-pressure side detected value PH as a latest sampled value is a first predetermined value $\Delta 1$ or more and whether or not a ratio of the high-pressure side detected value PH to the reference value PH0 is a second predetermined value $\Delta 2$ or more (S40). This process is implemented in order to determine whether or not the process of CNG filling is being implemented. A condition using the first predetermined value $\Delta 1$ and a condition using the second predetermined value $\Delta 2$ are employed in combination with the intention of making it unlikely that the filling process not actually being implemented will be determined to be implemented erroneously and then determining reliably that the filling process is being implemented.

Specifically, the CNG expands with a temperature rise. Thus, a rise in the high-pressure side detected value PH resulting from a temperature rise and a rise in the high-pressure side detected value PH resulting from the process of CNG filling are desirably distinguished from one another. For example, if the high-pressure side detected value PH is high as a result of pressure rise caused by a temperature rise, the high high-pressure side detected value PH may erroneously be determined to result from the implementation of the filling process. To avoid such an erroneous determination, the first predetermined value $\Delta 1$ is set. In this case, the high-pressure side detected value PH being low causes a risk in that the filling process cannot be determined to be implemented even if it is actually being implemented. Specifically, if the high-pressure side detected value PH is "10 Mpa," a pressure value rises to about "12 Mpa" with temperature rise. To prevent this rise in the pressure value resulting from the expansion of the CNG from being determined to result from the implementation of the filling process erroneously, the first predetermined value $\Delta 1$ should be set at a value higher than "2 Mpa." However, if the high-pressure side detected value PH is "2 Mpa" and rises to "4 Mpa" as a result of the filling process, the implementation of the filling process cannot be determined by setting the first predetermined value $\Delta 1$ at a value higher than "2 Mpa." In this regard, by using the second predetermined value $\Delta 2$ in combination, the first predetermined value $\Delta 1$ can be set at a value lower than "2 Mpa" and the probability of the aforementioned erroneous determination can be reduced.

If the high-pressure side detected value PH is high, it is difficult to distinguish pressure rise resulting from temperature rise and pressure rise resulting from the filling process from one another. Thus, if only the condition using the second predetermined value $\Delta 2$ is adopted, determination accuracy might be reduced if the high-pressure side detected value PH is high. In this regard, the occurrence of such a situation can be suppressed by adopting the condition using the first predetermined value Δ1.

If a positive determination is made in step S40, the process of CNG filling is regarded as being implemented. Thus, the CPU 72 as a second stop processor sets the filling determination flag ON and implements the mask process on the fuel leakage determination (S42). As a result, a negative determination is made in the process of step S20 shown in FIG. 3.

If the process in step S42 is completed or a negative determination is made in step S40, the CPU 72 determines whether or not a filling completion determination flag indicating completion of the filling process is switched from OFF to ON (S44). This process is implemented in order to determine whether or not the filling determination flag is to be set OFF. If it is determined that the filling completion determination flag is switched to ON (S44: YES), the CPU 72 sets the filling determination OFF and finishes the mask process (step S46). Thus, if the first cutoff valve 54 is opened, a positive determination is made in the process of step S20 shown in FIG. 3. If the process in step S46 is completed or a negative determination is made in step S44, the CPU 72 finishes a series of the aforementioned processes once.

Figure 7:
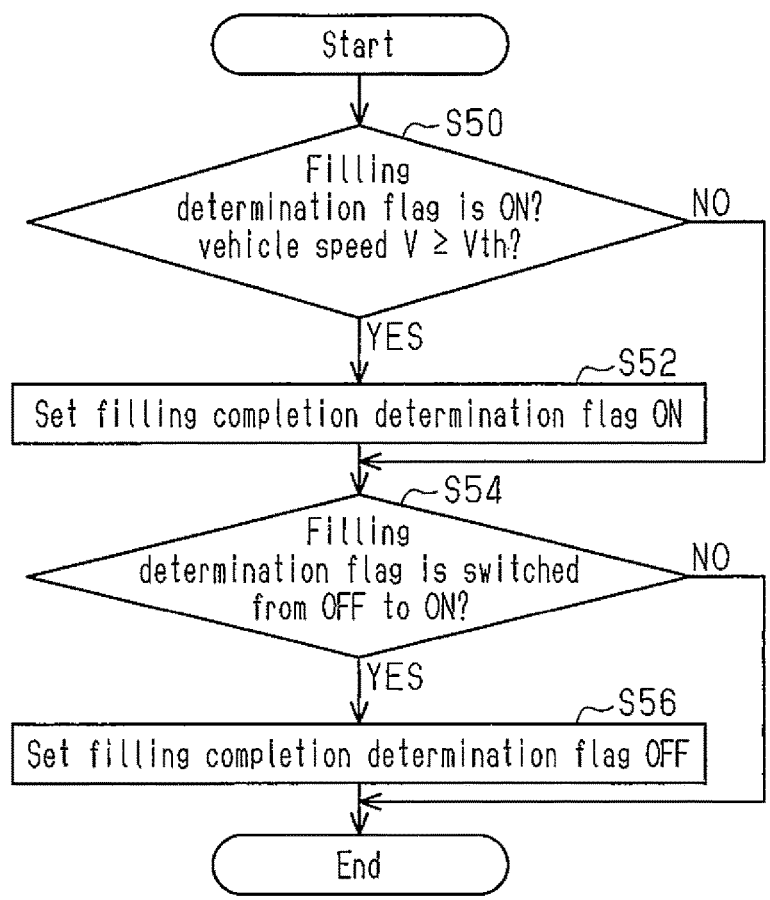
FIG. 7 is a flowchart showing a procedure of a filling completion determining process.

FIG. 7 shows a procedure of a process of determining whether or not the filling process is completed. This process is repeated at a predetermined frequency by the CPU 72 based on the masking program 74a in the nonvolatile memory 74 shown in FIG. 1.

In this process, the CPU 72 first determines whether or not the filling determination flag is ON and whether or not a vehicle speed V is a specified speed Vth or more (S50). The specified speed Vth is set at a value with which it can be determined whether a vehicle is in a stopped state or a traveling state. This process is implemented in order to determine whether or not the filling process is completed. It is a general notion that the filling process is completed before the vehicle starts traveling. Thus, it can be determined that the filling process is completed if the vehicle starts traveling.

If a positive determination is made in step S50, the CPU 72 sets the filling completion determination flag ON (S52). If the filling completion determination flag is set ON or if a negative determination is made in step S50, the CPU 72 determines whether or not the filling determination flag is switched to ON (S54). This process is implemented in order to determine whether or not the filling completion determination flag is to be set OFF. If it is determined that the filling determination flag is switched to ON (S54: YES), the CPU 72 sets the filling completion determination flag OFF. If the process in step S56 is completed or a negative determination is made in step S54, the CPU 72 finishes a series of the aforementioned processes once.

"Measure Responsive to Phenomenon Occurring Immediately after Nozzle for CNG Filling is Inserted into Filling Opening 68"

Figure 8:
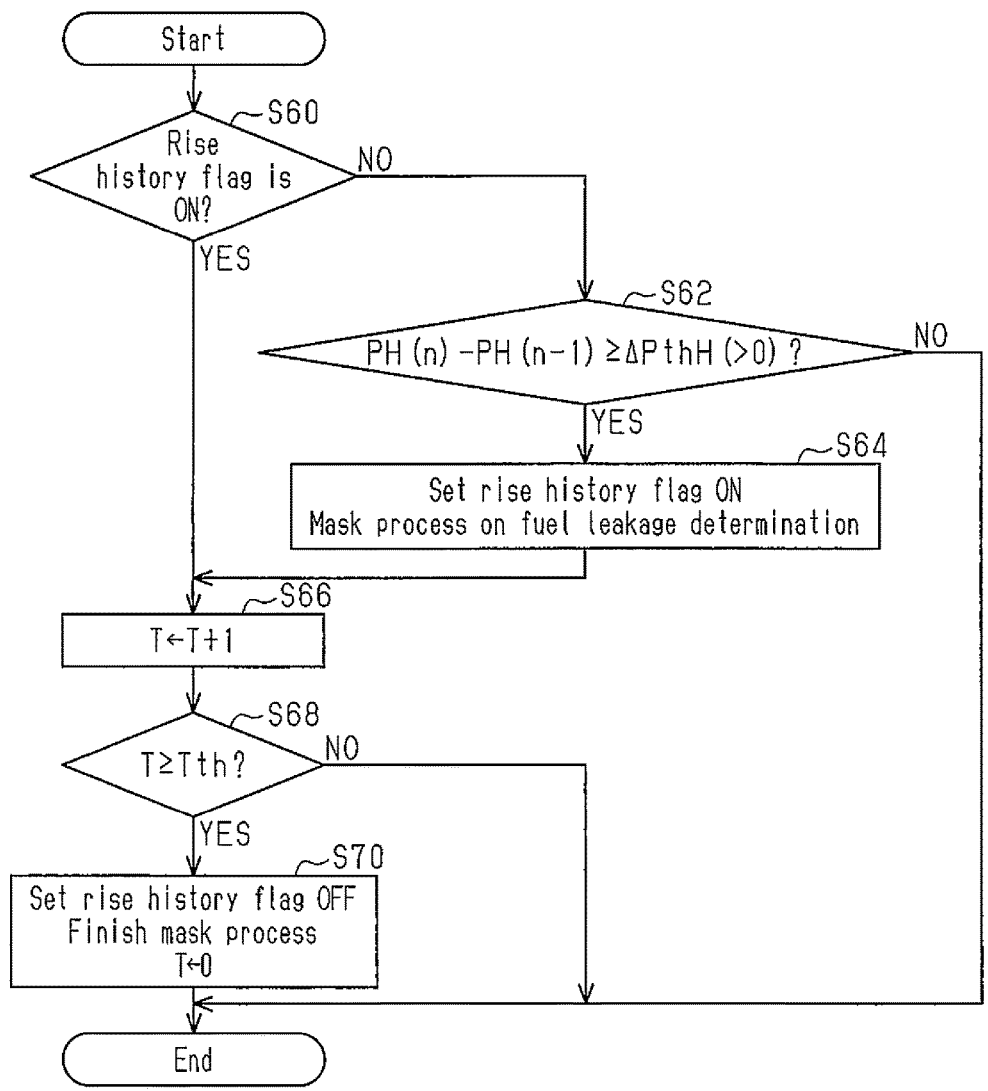
FIG. 8 is a flowchart showing a procedure of a mask process responsive to rise in a fuel pressure.
Figure 9:
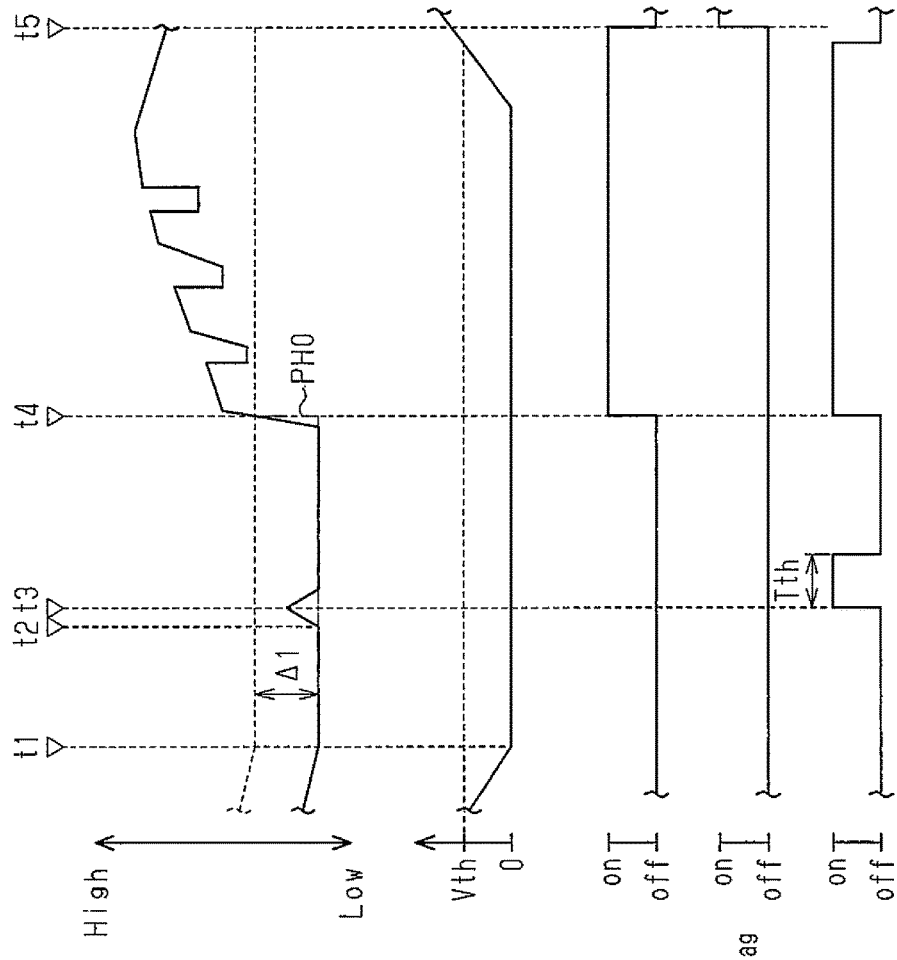
FIGS. 9(a) to 9(e) are timing diagrams each showing an example of the mask process.

FIG. 8 shows a procedure of the mask process. This process is repeated at a predetermined frequency by the CPU 72 based on the masking program 74a in the nonvolatile memory 74 shown in FIG. 1.

In this process, the CPU 72 first determines whether or not a rise history flag indicating a history of rise in the high-pressure side detected value PH is ON (S60). If it is determined that the rise history flag is OFF (S60: NO), the CPU 72 determines whether or not a quantified rise rate is a specified rate ΔPthH or more. The quantified rise rate is obtained by subtracting a last value PH(n−1) of the high-pressure side detected value PH from a current value PH(n) of the high-pressure side detected value PH. This process is implemented in order to sense a phenomenon where the high-pressure side detected value PH rises once as a result of insertion of the nozzle for CNG filling into the filling opening 68. If it is determined that the quantified rise rate is the specified rate ΔPthH or more (S62: YES), the CPU 72 as a first stop processor sets the rise history flag ON and implements the mask process on the fuel leakage determination (S64). As a result, a negative determination is made in the process of step S20 shown in FIG. 3.

If a positive determination is made in step S60 or if the process in step S64 is completed, the CPU 72 increments a timer T to measure a period of the mask process (S66). Next, the CPU 72 determines whether the timer T counts a specified period of time Tth or more (S68). This process is implemented in order to determine whether or not the mask process is to be finished. The specified period of time Tth is set at a period until a series of phenomena comes to an end including a rise in the high-pressure side detected value PH resulting from insertion of the nozzle for CNG filling into the filling opening 68 and subsequent drop in the high-pressure side detected value PH. If the high-pressure side detected value PH exhibits a phenomenon of attenuating while fluctuating as the high-pressure side detected value PH rises, the specified period of time Tth may be set at a period required until a determination made in the process of step S22 shown in FIG. 3 stops being positive. The specified period of time Tth can be set at a period shorter than a period from when the high-pressure side detected value PH rises largely as the pressure of the CNG blowing out from the nozzle rises during implementation of the filling process to when the high-pressure side detected value PH drops in response to temporal stop of supply of the CNG.

If it is determined that the timer T counts the specified period of time Tth or more (S68: YES), the CPU 72 sets the rise history flag OFF, finishes the mask process, and initializes the timer T (S70). If the process in step S70 is completed or a negative determination is made in step S62 or S68, the CPU 72 finishes a series of the aforementioned processes once.

The action of the gaseous fuel supply device according to the first embodiment is described next based on FIGS. 9(a) to 9(e). FIG. 9(a) shows how the high-pressure side detected value PH changes. FIG. 9(b) shows how the vehicle speed V changes. FIG. 9(c) shows how the filling determination flag changes. FIG. 9(d) shows how the filling completion determination flag changes. FIG. 9(e) shows how the presence or absence of implementation of the mask process changes.

As shown in FIGS. 9(a) and 9(b), when a vehicle stops at a time t1 and the nozzle for CNG filling is inserted into the filling opening 68 at a time t2, the high-pressure side detected value PH rises. In response, the mask process is implemented for the specified period of time Tth from a time t3 if the combustion control using the CNG injector 14 continues. As a result, a negative determination is made in step S20 of FIG. 3.

Next, supply of the CNG from the CNG station is started to start the process of CNG filling. Then, a difference between the high-pressure side detected value PH and the reference value PH0 becomes the first predetermined value Δ1 or more. Although not shown in the drawings, a ratio of the high-pressure side detected value PH to the reference value PH0 becomes the second predetermined value Δ2 or more. As a result of these, the filling determination flag is set ON at a time t4. Further, by the implementation of the mask process, a negative determination is made in step S20 of FIG. 3 if the combustion control using the CNG injector 14 continues. Then, at a time t5 when the vehicle speed V becomes the specified speed Vth or more, the filling completion determination flag is set ON and the filling determination flag is set OFF to finish the mask process.

The first embodiment described above achieves the following effects.

(1) As shown in FIG. 8, if the rise rate of the high-pressure side detected value PH is the specified rate ΔPthH or more, the mask process is implemented for the specified period of time Tth that prevents fulfillment of the condition for implementing the process of determining fuel leakage (step S22 of FIG. 3). This can make it unlikely that the fail-safe process will be implemented erroneously by temporal rise and drop in the high-pressure side detected value PH caused by insertion of the nozzle for CNG filling into the filling opening 68.

(2) As shown in FIG. 6, on condition that the high-pressure side detected value PH rises by an amount the same as a predetermined value or more, the mask process is implemented that prevents fulfillment of the condition for implementing the process of determining fuel leakage (step S22 of FIG. 3). This can make it unlikely that the fail-safe process will be implemented erroneously by a phenomenon where the high-pressure side detected value PH drops temporarily while the pressure of the CNG being supplied at the CNG station is raised in stages.

(3) If the vehicle speed V is the specified speed Vth or more, the filling process is determined to be completed. This can prevent making an erroneous determination that the filling process is completed before completion of this filling process. This can also make it unlikely that a period of the mask process will be extended excessively.

(4) If the high-pressure side detected value PH becomes higher than the reference value PH0 by the first predetermined value Δ1 or more and if a ratio of the high-pressure side detected value PH to the reference value PH0 becomes the second predetermined value Δ2 or more, the filling process is determined to be implemented. This makes it possible to distinguish a rise in the high-pressure side detected value PH resulting from a temperature rise and a rise in the high-pressure side detected value PH resulting from the process of CNG filling from one another. As a result, implementation of the filling process can be determined with a high degree of accuracy.

(5) As shown in FIG. 3, the fuel leakage determination is made on condition that the first cutoff valve 54 is opened. Even in this case, the high-pressure side detected value PH still drops if the nozzle for CNG filling is inserted into the filling opening 68 or the pressure of the CNG being supplied is changed in stages, causing a risk in that the fail-safe process is implemented erroneously. Avoiding such a situation might be impossible by means intended to prevent a malfunction from being detected erroneously as a result of the filling process implemented when the first cutoff valve 54 is closed. This places a high value on the use of the processes shown in FIGS. 3 to 8 by means of the masking program 74a.

(6) To make it unlikely that the fail-safe process will be implemented erroneously during CNG filling, the processes of FIGS. 3 to 7 and the process of FIG. 8 are used in combination. Compared to the implementation of the mask process, this can make it unlikely that the fail-safe process will be implemented erroneously in a period from when a cap is detached from the filling opening 68 to when the cap is attached to the filling opening 68. Then, reduction in an opportunity of implementing the process of determining the presence or absence of fuel leakage can be minimized.

Second Embodiment

Figure 10:
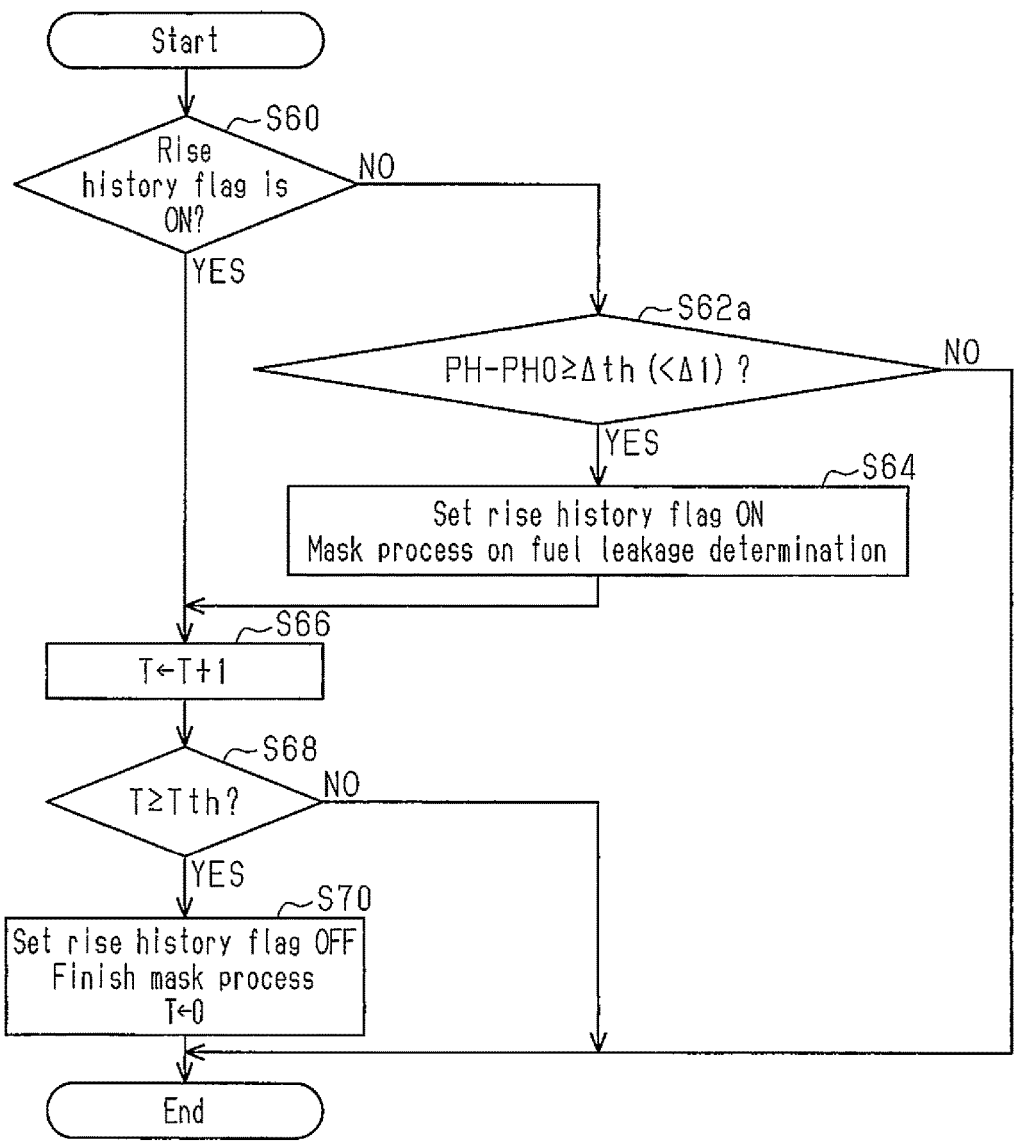
FIG. 10 is a flowchart showing a procedure of a mask process responsive to rise in a fuel pressure according to a second embodiment of this invention.

The following description of a second embodiment given by referring to FIG. 10 is mainly intended for a difference from the first embodiment.

In the first embodiment, a phenomenon occurring immediately after the nozzle for CNG filling is inserted into the filling opening 68 is sensed based on the rise rate of the high-pressure side detected value PH. By contrast, in the second embodiment, this phenomenon is sensed based on the amount of rise in the high-pressure side detected value PH from the reference value PH0.

FIG. 10 shows a procedure of a mask process according to the second embodiment. This process is repeated at a predetermined frequency by the CPU 72 based on the masking program 74a in the nonvolatile memory 74 shown in FIG. 1. In FIG. 10, processes corresponding to those shown in FIG. 8 are identified by the same step numbers.

In this process, if a negative determination is made in step S60, the CPU 72 determines whether or not the rise amount of the high-pressure side detected value PH is a threshold Δth or more (S62a). The rise amount of the high-pressure side detected value PH is obtained by subtracting the reference value PH0 from the high-pressure side detected value PH. This process is implemented in order to determine whether or not a phenomenon where the high-pressure side detected value PH rises as a result of insertion of the nozzle for CNG filling into the filling opening 68 has occurred. The threshold Δth is set at a value lower than the first predetermined value Δ1. This setting is made for the reason that the rise amount of the high-pressure side detected value PH resulting from insertion of the nozzle into the filling opening 68 tends to be smaller than the rise amount of the high-pressure side detected value PH resulting from the filling process, as shown in FIG. 4.

The second embodiment described above achieves the following effect in addition to the effects (2) to (6) of the first embodiment.

(7) If the rise amount obtained by subtracting the reference value PH0 from the high-pressure side detected value PH is the threshold Δth or more, the mask process is implemented for the specified period of time Tth that prevents fulfillment of the condition for implementing the process of determining fuel leakage (step S22 of FIG. 3). This can make it unlikely that the fail-safe process will be implemented erroneously by temporal rise and drop in the high-pressure side detected value PH caused by insertion of the nozzle for CNG filling into the filling opening 68.

Each of the aforementioned embodiments can be changed as follows.

"Way of Stopping Malfunction Detection for Implementation of Fail-Safe Process"

This way is not limited to the way of preventing fulfillment of the condition for implementing the process in step S22 of FIG. 3. For example, if the mask process is implemented while the process in step S22 continues, making a shift to the process in step S24 can be omitted. Making a shift to the process in step S26 can be omitted if the mask process is implemented while the processes in steps S22 and S24 are possible. For the implementation of the mask process, the high-pressure side detected value PH input by the process in step S22 can be used as a value sampled before the implementation of the mask process.

"Malfunction Detector"

The malfunction detector implements detection of fuel leakage on condition that it is not limited to opening of the first cutoff valve 54. The malfunction detector may detect fuel leakage based on a drop in a pressure in the high-pressure side path 56 while the internal combustion engine 10 stops on condition that the combustion control using the CNG injector 14 is not implemented, for example. In this case, a phenomenon where a pressure in the high-pressure side path 56 temporarily rises as a result of insertion of the nozzle for CNG filling into the filling opening 68 and then drops is also considered to occur. This can be handled effectively by implementing the mask process for the specified period of time Tth based on a rise in the high-pressure side detected value PH.

"First Stop Processor"

In the first embodiment, the first stop processor inputs a difference between the current value PH(n) and the last value PH(n−1) of the high-pressure side detected value PH. Alternatively, the first stop processor may input a difference between the sum of two sampled values of the high-pressure side detected value PH sampled most recently and the sum of two sampled values of the high-pressure side detected value PH sampled before the most recent values, for example.

A ratio of the high-pressure side detected value PH to the reference value PH0 is not the only basis to be used for increasing the rise amount of the high-pressure side detected value PH as a condition for implementing the mask process in response to increase in the reference value PH0. Alternatively, the threshold Δth may be set in such as manner as to become higher in response to increase in the reference value PH0, for example.

Instead of the process of the second embodiment, the mask process may be implemented if a difference between the high-pressure side detected value PH and the reference value PH0 is a first threshold or more and if a ratio of the high-pressure side detected value PH to the reference value PH0 is a second threshold or more. Still alternatively, the mask process may be implemented only if a ratio of the high-pressure side detected value PH to the reference value PH0 is the second threshold or more.

The first stop processor may be realized by a software process or by dedicated hardware means.

"Second Stop Processor"

In the aforementioned embodiments, a filled state is determined based on a difference between the high-pressure side detected value PH and the reference value PH0 and a ratio of the high-pressure side detected value PH to the reference value PH0. Alternatively, the filled state may be determined based on only the difference between the high-pressure side detected value PH and the reference value PH0, for example. Still alternatively, the filled state may be determined based on only the ratio of the high-pressure side detected value PH to the reference value PH0.

A ratio of the high-pressure side detected value PH to the reference value PH0 is not the only basis to be used for determining that the filling process is being implemented as the rise amount of the high-pressure side detected value PH increases in response to an increase in the reference value PH0. Alternatively, the first predetermined value Δ1 may be set in such as manner as to become higher in response to an increase in the reference value PH0, for example. Reducing the increase rate of the first predetermined value Δ1 relative to an increase in the reference value PH0 as the reference value PH0 becomes higher achieves an effect comparable to the effect achieved by the method of determining the filled state based on a difference between the high-pressure side detected value PH and the reference value PH0 and a ratio of the high-pressure side detected value PH to the reference value PH0.

The reference value PH0 is not limited to a value calculated by the process shown in FIG. 5. For example, the high-pressure side detected value PH obtained immediately before a rise in the high-pressure side detected value PH is determined may be used as a reference value.

The second stop processor may be realized by software process or by dedicated hardware means.

"Predetermined Period"

In the aforementioned embodiments, timing of setting the filling determination flag OFF (end of a predetermined period) is determined to coincide with timing of the vehicle speed V being the specified speed Vth or more. Alternatively, the filling determination flag may be set OFF to coincide with one of the timing of an elapse of a period of time required for the filling process and timing of the vehicle speed V being the specified speed Vth or more that is to come earlier than the other, for example. By doing this, even if a vehicle is not to start traveling immediately after completion of the filling, the malfunction detecting process for implementing the fail-safe process can still be started at an early stage.

Inputting the vehicle speed V is not the only process of detecting start of travel of a vehicle. For example, the process of detecting the start of travel of a vehicle may also be implemented by inputting a detection signal indicating operation on a shift lever from a parking range to a drive range or a detection signal indicating that an accelerator operating member has been manipulated while a brake is released.

Instead of coinciding with timing of setting the filling determination flag OFF, timing of detecting start of travel of a vehicle may coincide with timing of elapse of a period of time required for the filling process, for example.

"Internal Combustion Engine"

The gaseous fuel may also be hydrogen gas or dimethyl ether (DME).

The internal combustion engine may be an internal combustion engine that uses only the CNG as fuel.

Instead of being an internal combustion engine including a crankshaft mechanically coupled to a driving wheel, the internal combustion engine may be an internal combustion engine including a crankshaft mechanically coupled to a vehicle-installed generator of a series hybrid vehicle.

The invention claimed is:

1. A gaseous fuel supply device comprising:
a storage chamber storing gaseous fuel;
an injector used for supplying the gaseous fuel to a combustion chamber of an internal combustion engine;
a pressure detector that detects a pressure in a fuel supply path between the storage chamber and the injector; and
an electronic control unit (ECU) including a central processing unit (CPU) and programmed to:
detect a malfunction based on a drop in the pressure detected by the pressure detector;
implement a fail-safe process if the ECU detects a malfunction; and
stop malfunction detection, for a specified period of time, for implementing the fail-safe process if the pressure is determined to rise at a specified rate or more.

2. The gaseous fuel supply device according to claim 1, wherein the ECU includes a first stop processor,
the gaseous fuel supply device comprising a second stop processor configured to stop the malfunction detection, for a predetermined period, for implementing the fail-safe process if the pressure is determined to rise by an amount the same as a predetermined value or more.

3. The gaseous fuel supply device according to claim 2, wherein the predetermined period is longer than the specified period of time.

4. A gaseous fuel supply device comprising:
a storage chamber storing gaseous fuel;
an injector used for supplying the gaseous fuel to a combustion chamber of an internal combustion engine;
a pressure detector that detects a pressure in a fuel supply path between the storage chamber and the injector; and
an electronic control unit (ECU) including a central processing unit (CPU) and programmed to:
detect a malfunction based on drop in the pressure detected by the pressure detector;
implement a fail-safe process if the ECU detects a malfunction;
stop malfunction detection, for a specified period of time, for implementing the fail-safe process if the pressure is determined to rise by an amount the same as a threshold or more; and
stop the malfunction detection, for a predetermined period, for implementing the fail-safe process if the pressure is determined to rise by an amount the same as a predetermined value or more, the predetermined value being higher than the threshold,
wherein the predetermined period is longer than the specified period of time.

5. The gaseous fuel supply device according to claim 2, wherein
the internal combustion engine is a vehicle-installed internal combustion engine, and
the end of the predetermined period is set based on timing of detecting start of travel of a vehicle detected by the ECU.

6. The gaseous fuel supply device according to claim 2, wherein
the rise amount of the pressure is sensed as the amount of rise from a value of the pressure before the pressure rises, and
the second stop processor sets the predetermined value at a higher value as the pressure to be detected takes a higher value before the pressure rises.

7. The gaseous fuel supply device according to claim 1, comprising a solenoid valve that is opened and closed for communication between the fuel supply path and the storage chamber,
wherein if the solenoid valve is opened, the ECU implements the malfunction detection.

* * * * *